United States Patent
Willig et al.

(10) Patent No.: US 6,752,017 B2
(45) Date of Patent: Jun. 22, 2004

(54) ROTATION SPEED SENSOR (75) Inventors: Rainer Willig, Tamm (DE); Andreas Thomae, Tuebingen (DE); Burkhard Kuhlmann, Eningen (DE); Joerg Hauer, Reutlingen (DE); Udo Martin Gomez, Leonberg (DE); Siegbert Goetz, Gerlingen (DE); Christian Doering, Stuttgart (DE); Michael Fehrenbach, Reutlingen (DE); Wolfram Bauer, Tuebingen (DE); Udo Bischof, Wannweil (DE); Reinhard Neul, Stuttgart (DE); Karsten Funk, Palo Alto, CA (US); Markus Lutz, Sunnyvale, CA (US); Gerhard Wucher, Reutlingen (DE); Jochen Franz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/258,339

(22) PCT Filed: Feb. 13, 2002

(86) PCT No.: PCT/DE02/00499

§ 371 (c)(1),
(2), (4) Date: Mar. 19, 2003

(87) PCT Pub. No.: WO02/066928

PCT Pub. Date: Aug. 29, 2002

(65) Prior Publication Data

US 2003/0164040 A1 Sep. 4, 2003

(30) Foreign Application Priority Data

Feb. 21, 2001 (DE) .......................................... 101 08 196

(51) Int. Cl.[7] .......................... G01P 15/14; G01C 19/00
(52) U.S. Cl. .............................. 73/504.04; 73/504.12; 73/504.16
(58) Field of Search ...................... 73/504.02, 504.03, 73/504.04, 504.08, 504.12, 504.15, 504.16

(56) References Cited

U.S. PATENT DOCUMENTS

| 5,396,797 | A | | 3/1995 | Hulsing ........................ 73/505 |
|---|---|---|---|---|
| 5,604,312 | A | | 2/1997 | Lutz ......................... 73/504.14 |
| 5,635,638 | A | | 6/1997 | Geen ........................ 73/504.04 |
| 5,728,936 | A | | 3/1998 | Lutz ......................... 73/504.14 |
| 6,067,858 | A | | 5/2000 | Clark et al. ............... 73/504.16 |
| 6,189,381 | B1 | * | 2/2001 | Huang et al. ............. 73/504.12 |
| 6,308,567 | B1 | * | 10/2001 | Higuchi et al. .......... 73/504.12 |
| 6,434,451 | B1 | * | 8/2002 | Lohberg et al. ................ 701/1 |
| 6,516,666 | B1 | * | 2/2003 | Li ........................... 73/504.12 |

FOREIGN PATENT DOCUMENTS

| DE | 44 14 237 | 10/1995 |
|---|---|---|
| DE | 44 28 405 | 2/1996 |
| DE | 44 42 033 | 5/1996 |
| DE | 195 19 488 | 11/1996 |
| DE | 195 30 007 | 2/1997 |
| DE | 196 41 284 | 5/1998 |
| DE | 100 35 605 | 1/2001 |
| EP | 0 911 606 | 4/1999 |
| WO | WO 98 15799 | 4/1998 |

* cited by examiner

Primary Examiner—Hezron Williams
Assistant Examiner—Rose M. Miller
(74) Attorney, Agent, or Firm—Kenyon & Kenyon (57) ABSTRACT

A yaw-rate sensor is proposed having a first and a second Coriolis element (100, 200) which are arranged side-by-side above a surface (1) of a substrate. The Coriolis elements (100, 200) are induced to oscillate parallel to a first axis. Due to a Coriolis force, the Coriolis elements (100, 200) are deflected in a second axis which is perpendicular to the first axis. The first and second Coriolis elements (100, 200) are coupled by a spring (52) which is designed to be yielding in the first and in the second axis. Thus, the frequencies of the oscillations in the two axes are developed differently for the in-phase and antiphase oscillation.

10 Claims, 6 Drawing Sheets

ROTATION SPEED SENSOR

BACKGROUND INFORMATION

The present invention is based on a yaw-rate sensor according to the definition of the species in the independent patent claim.

Yaw-rate sensors in which a first and a second Coriolis element are arranged on the surface of a substrate are already known from the U.S. Pat. No. 5,728,936. The Coriolis elements are induced to oscillate in a first axis. The deflections of the Coriolis elements due to a Coriolis force in a second axis, which is likewise parallel to the substrate, are verified.

SUMMARY OF THE INVENTION

In contrast, the yaw-rate sensor of the present invention having the features of the independent patent claim has the advantage that a clear frequency separation of the different oscillation modes is achieved. Thus, it is possible to specifically excite the antiphase oscillation by the selection of an appropriate excitation frequency.

Further advantages and improvements are yielded by the measures in the dependent patent claims. If the gravitational centers of the Coriolis elements move perpendicular to a straight connecting line between the gravitational centers, then on average over time, the deflections of the Coriolis elements because of the Coriolis force lie on one and the same axis, in which an angular acceleration exerts no force component whatsoever. A further form of the excitation is effected by an oscillation of both Coriolis elements on one axis.

The Coriolis elements are induced to oscillate particularly easily by a drive element which transmits driving forces through springs. In this case, the Coriolis element may be suspended completely on this drive element. Electrostatic comb drives may be provided on the drive elements as excitation means. The Coriolis force may be verified in that the Coriolis element has movable electrodes which are arranged opposite stationary electrodes. However, verification elements may also be provided to which the Coriolis forces are transmitted by springs. In this case, it is possible in particular to suspend the verification elements in such a way on the substrate that only a movement in the direction of the Coriolis forces takes place. Interference effects because of a movement of the movable electrodes which are not in the verification direction are thereby suppressed.

BRIEF DESCRIPTION OF THE DRAWING

Exemplary embodiments of the invention are shown in the Drawing and are explained in greater detail in the following description.

SPECIFICATION

Figure 1:
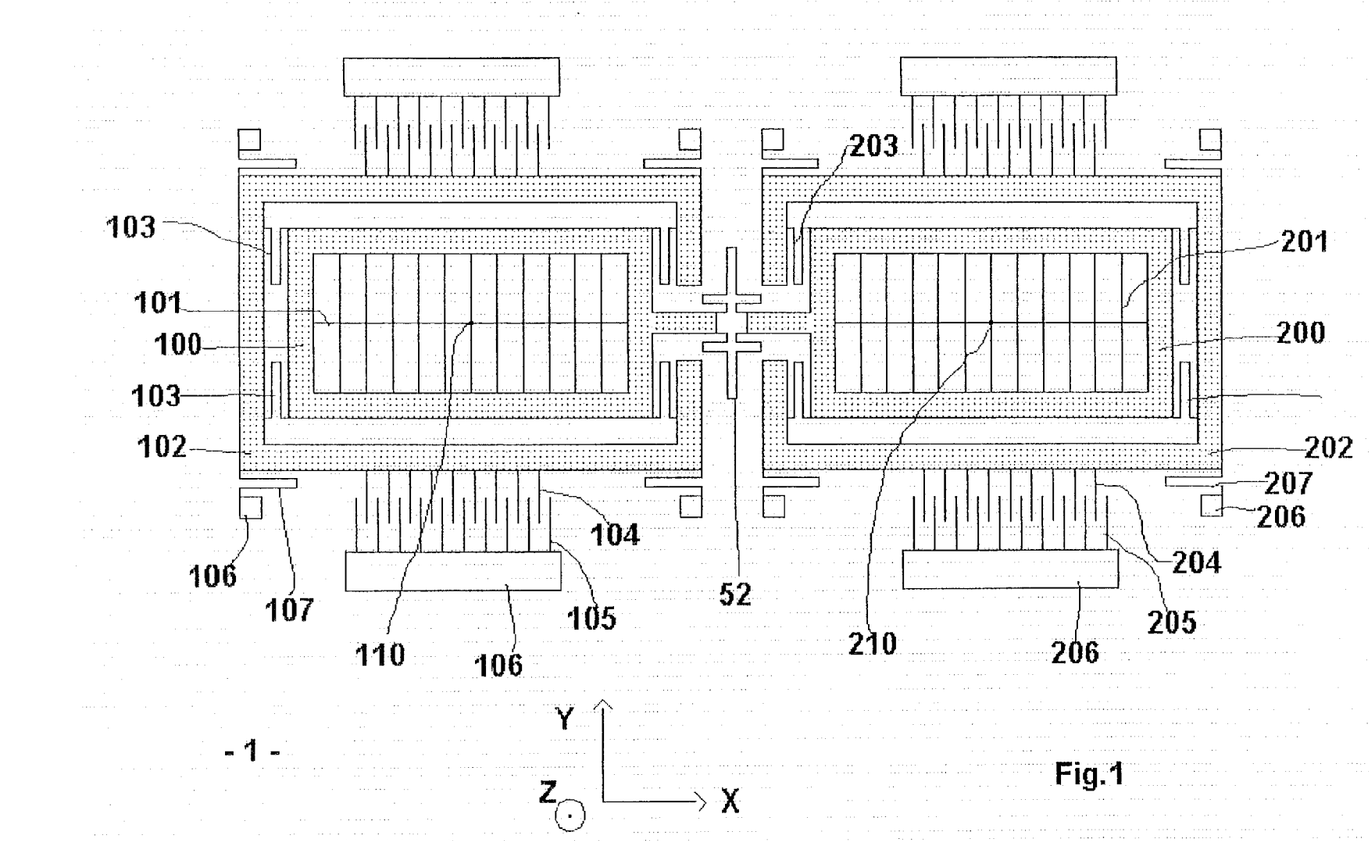
FIG. 1 shows a top view of a first yaw-rate sensor according to the present invention.
Figure 2:
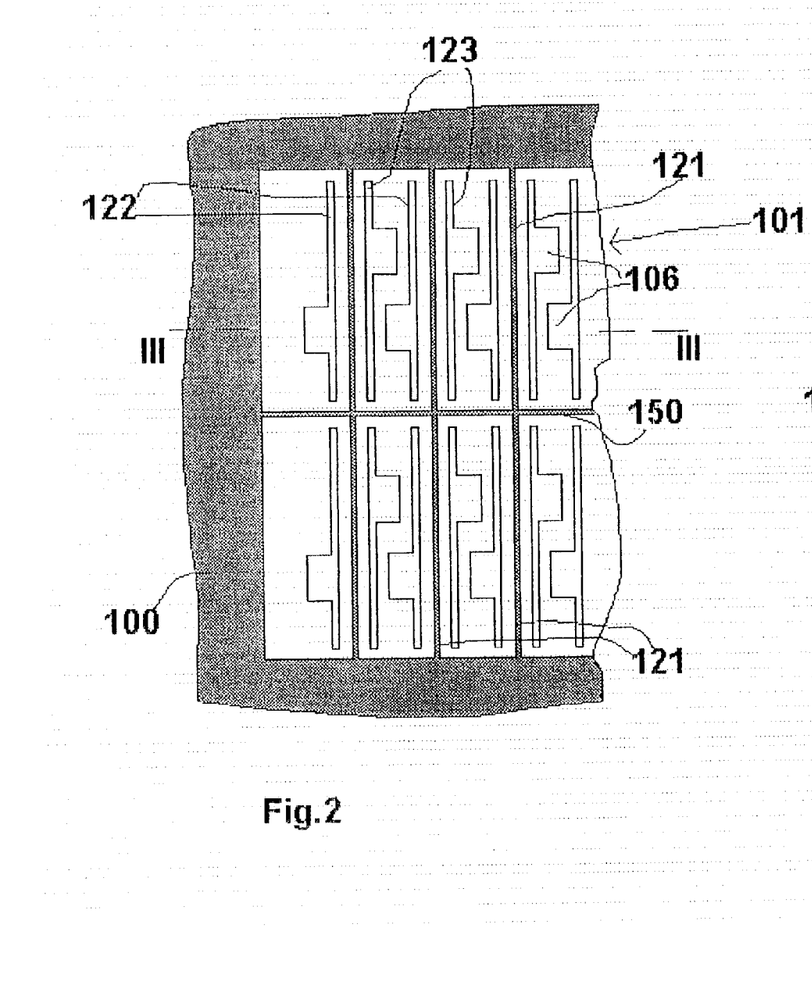
FIG. 2 shows a detail view of the yaw-rate sensor according to FIG. 1.
Figure 3:
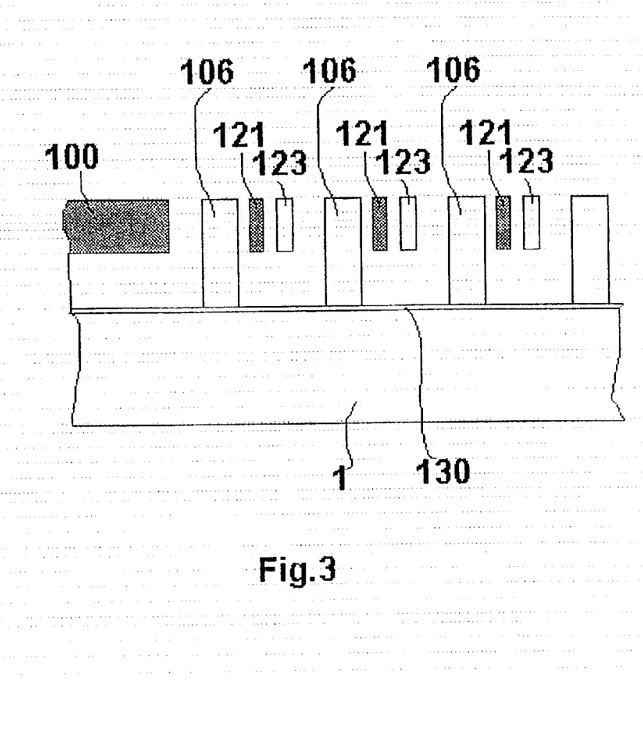
FIG. 3 shows a cross-section through FIG. 2.

A first exemplary embodiment of the invention is clarified in FIGS. 1–3. FIG. 1 shows a top view of the entire yaw-rate sensor, FIG. 2 shows a detail view of a portion of the yaw-rate sensor and FIG. 3 shows a side view of a cross-section through FIG. 2.

FIG. 1 shows a top view of a substrate 1, not shown more precisely in FIG. 1, in which a first Coriolis element 100 and a second Coriolis element 200 are arranged. First and second Coriolis elements 100, 200 are rectangular, frame-shaped structures. Frame-shaped Coriolis elements 100 and 200 surround detection means 101, 201 which are shown simplified in FIG. 1 as grid lines. The detection means are shown in the detail view of FIG. 2 and explained more precisely below. Frame-shaped Coriolis elements 100, 200 are surrounded by substantially rectangular, frame-shaped drive elements 102, 202 which are each interrupted on the sides facing each other. Coriolis elements 100, 200 are interconnected through these openings by a coupling spring 52. The coupling spring is constructed such that it is yielding both in the X-direction and in the Y-direction. The connection between drive elements 102, 202 and the Coriolis elements is produced by torsion springs 103, 203. The torsion springs are constructed so that they are yielding in the X-direction and stiff in the Y-direction. Secured to drive elements 102, 202 are movable electrodes 104, 204 which grab in a comb-like manner in stationary electrodes 105, 205. Stationary electrodes 105, 205 are fixedly joined to substrate 1 by bearing blocks 106, 206. Moreover, drive elements 102, 202 are connected by springs 107, 207 to further bearing blocks 106, 206 that are likewise fixedly joined to substrate 1.

Thus, the yaw-rate sensor is connected to substrate 1 only via bearing blocks 106, 206. Therefore, both Coriolis elements 100, 200 and drive elements 102, 202 may be moved in any way desired relative to substrate 1. The movement of these elements is determined only by spring elements 103, 203 and 107, 207.

Springs 107, 207 are designed such that they are yielding in the Y-direction and stiff in the X-direction. Drive elements 102, 202 are thus essentially able to move only along paths which are parallel to the Y-direction. Coriolis elements 100, 200 are connected to drive elements 102, 202 via springs 103, 203. Coriolis elements 100, 200 are therefore able to move essentially only in the X-direction relative to drive elements 102, 202. In response to a movement of drive elements 102, 202 in a direction which is parallel to the Y-direction, Coriolis elements 100, 200 are naturally also moved in this direction. Thus, relative to substrate 1, Coriolis elements 100, 200 are movable in a direction parallel to the Y-direction and in the X-direction.

A gravitational center 110, 210 of each of Coriolis elements 100, 200 is also indicated for describing the functioning of the sensor. In each case, the gravitational centers lie in the center point of frame-shaped Coriolis elements 100, 200.

Drive elements 102, 202 are excited to oscillate by applying electric voltages between movable electrodes 104, 204 and stationary electrodes 105, 205. Accordingly, Coriolis elements 100, 200 are also induced to oscillate. Gravitational centers 110, 210 of Coriolis elements 100, 200 then each move on an axis which is parallel to the Y-axis. The movements of both Coriolis elements 100, 200 therefore take place in axes which are parallel to one another. In so doing, without the influence of a Coriolis force, (i.e. without a rotation of the substrate about an axis which is perpendicular to substrate 1), the gravitational centers move on straight lines that are parallel to one another. If, in this context, a rotation of substrate 1 about the Z-axis occurs, i.e., about the axis which is perpendicular to substrate 1, then Coriolis forces that are perpendicular to the axis of rotation and perpendicular to the axis of motion act on each of Coriolis elements 100, 200. These forces then act in the X-direction.

Thus, movable electrodes 104, 204, together with stationary electrodes 105, 205 and drive elements 102, 202 form excitation means by which Coriolis elements 100, 200 are induced to oscillate, the oscillation axes of gravitational centers 110, 210 being aligned parallel to one another. At the same time, these axes are arranged at a certain distance relative to each other which amounts at least to the lateral extension of one of Coriolis elements 100, 200 in the X-direction.

The two Coriolis elements 100, 200 are connected by a coupling spring 52 which is yielding both in the X-direction and in the Y-direction. A separation of oscillation modes of Coriolis elements 100, 200 in the X-direction and Y-direction in terms of frequency is achieved by this coupling spring. Namely, for an in-phase oscillation in the Y-direction, the spring constants of springs 107, 207 must be taken into account. For an antiphase oscillation in the Y direction, in addition to the spring constants of springs 107, 207, the spring constant of coupling spring 52 in the Y-direction must also be considered. For an in-phase oscillation in the X-direction, the spring constants of springs 103, 203 must be taken into account. For an antiphase oscillation in the X direction, in addition to the spring constants of springs 103, 203, the spring constant of coupling spring 52 in the X-direction must also be considered. The natural frequencies of the in-phase oscillations in the X-direction and Y-direction thus differ from the frequency of the antiphase oscillations, which facilitates a targeted excitation of the different oscillation modes. An excitation of the antiphase oscillation modes is particularly desired here. For the Y-direction, this means that when left Coriolis element 100 of the yaw-rate sensor moves downward, right Coriolis element 200 should move upward and vice versa. For the X-direction, this means that when left Coriolis element 100 of the yaw-rate sensor moves to the left, right Coriolis element 200 should move to the right and vice versa. Thus, the antiphase oscillation modes may be specifically excited by the selection of a suitable excitation frequency, which is applied as electric AC voltage to electrodes 105, 205, 104, 204.

Coupling spring 52 is configured here as a simple cloverleaf spring. However, this is only one possibility. In general, all elements are suitable which are designed to be yielding both in the X-direction and in the Y-direction. Understood by "yielding" here is a spring constant which allows a deflection of the Coriolis elements relative to the substrate in response to the forces usually occurring. What "yielding" is must be determined in the individual case in terms of the masses of Coriolis elements 100, 200 and the forces occurring. The coupling spring is to be designed in such a way that the parallel and anti-parallel oscillation modes are sufficiently sharply separated in terms of frequency both in the X-direction and in the Y-direction, and at the same time, the smallest possible mechanical deformations are produced. Furthermore, the coupling spring is to be designed such that mechanical non-linearities are minimized, and moreover, a stress-decoupled connection is formed between the Coriolis elements.

It is also advantageous that, relative to the rest position of Coriolis elements 100, 200, the movement in the X-direction takes place on a common axis. The advantage of this principle is that an angular acceleration about the Z-axis is unable to exert any direct influence on the movement of Coriolis elements 100, 200, since they are not deflected by an angular acceleration about the Z-axis. The yaw-rate sensor is therefore particularly insensitive with respect to angular accelerations about the Z-axis.

FIG. 2 shows an enlarged detail view of evaluation means 101 of Coriolis element 100 of FIG. 1. Frame-shaped Coriolis element 100 surrounds evaluation means 101. They are configured as grid-shaped electrodes 121, a plurality of grid-shaped electrodes 121 being provided within the frame-shaped structure of Coriolis element 100. For stabilization, these grid-shaped electrodes 121 are also interconnected by a center bar 150. Each electrode 121 moves together with Coriolis element 100. Electrodes 121 are positioned between stationary electrodes 122, 123 which are secured to substrate 1 by bearings 106. Electrodes 122, 123 therefore take the form of stationary electrodes which do not move relative to the substrate.

FIG. 3 shows a cross-section along line III—III of FIG. 2. FIG. 3 shows, in cross-section, substrate 1 and a printed circuit trace 130 configured on the surface of the substrate. Anchorings 106 are secured to this printed circuit trace 130, and thus are fixedly joined to substrate 1. Bearings 106 and also the electrodes attached thereto, are electrically conductive and are parallel-connected through printed circuit trace 130. Each movable electrode 121 is disposed between a stationary electrode 122 and a stationary electrode 123. Thus, two capacitors are formed, first of all between movable electrode 121 and electrodes 122, and secondly between movable electrode 121 and stationary electrodes 123. These two capacitors take the form of differential capacitors, that is to say, in response to an increase of the one capacitance, the other capacitance decreases accordingly. Due to the lateral displacement of bearing blocks 106 of the two electrode groups 122, 123, in each case the corresponding capacitors are able to be connected in parallel to each other by suitable printed circuit traces 130.

In FIG. 3, it is very easy to see in cross-section that Coriolis element 100 is disposed above substrate 1 and that electrodes 121, which are connected to Coriolis element 100, are also arranged above substrate 1. In the cross-section, the section through bearing blocks 106 of electrodes 122 is shown, which are arranged by way of bearing blocks 106 on printed circuit trace 130, and thus are fixedly connected to substrate 1. Electrodes 123 are likewise shown above the substrate in the cross-section of FIG. 3. However, at another point, they are fixedly connected to substrate 1 via a corresponding printed circuit trace 130 for these electrodes.

Used as the material for substrate 1 and the elements arranged above the substrate, such as Coriolis elements 100, 200, drive elements 102, 202, the springs and electrodes, is preferably silicon which is made conductive by suitable doping. The substrate may be electrically insulated where it is necessary using insulating layers. However, other materials such as ceramic, glass or metals may also be used for the sensors.

Important in the yaw-rate sensors according to FIG. 1 is that on the basis of coupling spring 52, which is yielding in the X-direction and Y-direction, a separation in terms of frequency of the antiphase and in-phase oscillation is effected in both oscillation directions (X and Y). By controlled feeding of suitable frequencies, it is therefore possible to generate the desired antiphase oscillations.

Figure 4:
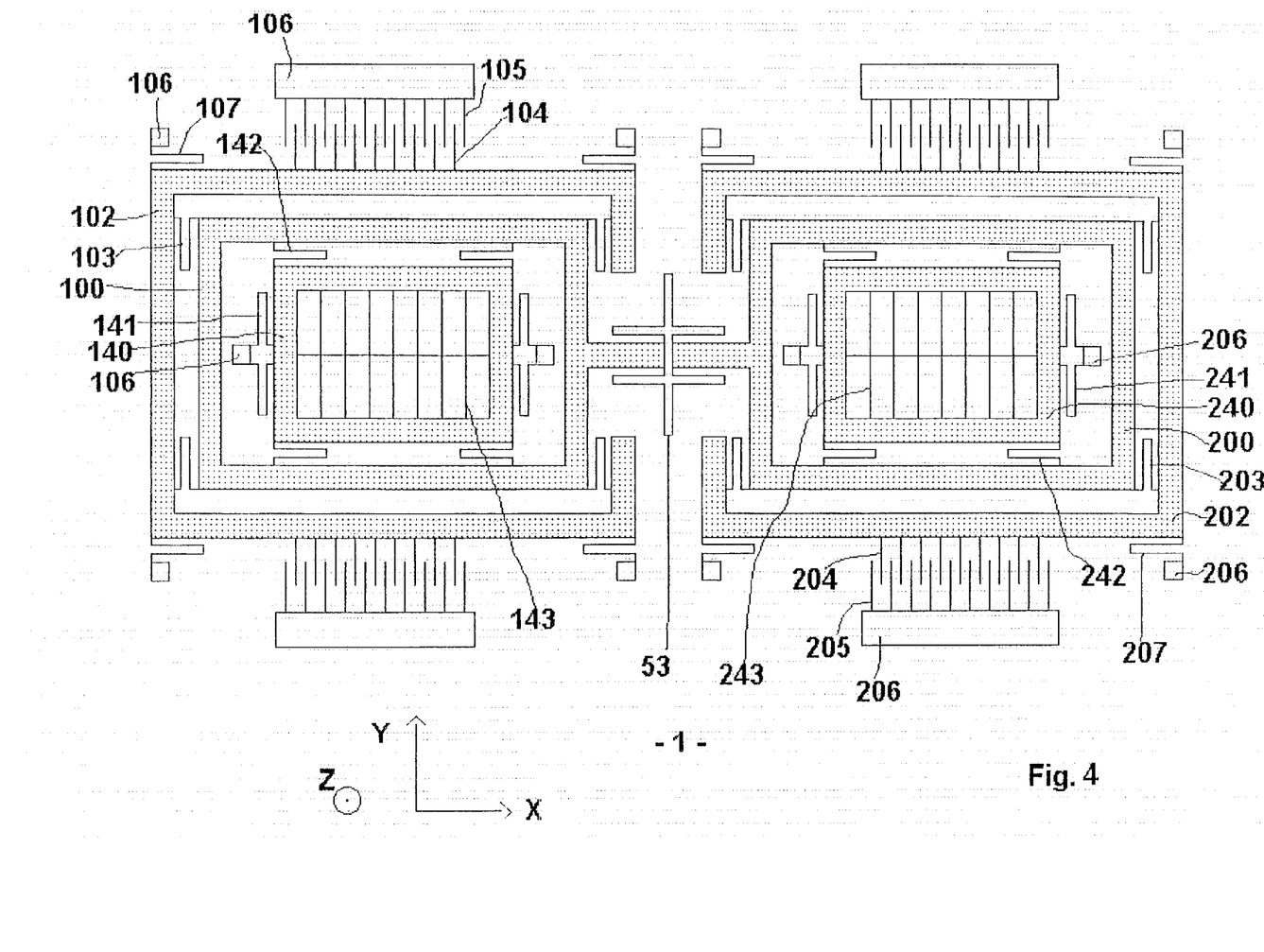
FIG. 4 shows a further exemplary embodiment of the yaw-rate sensor in a top view.

FIG. 4 shows the top view of a further exemplary embodiment of a yaw-rate sensor according to the invention. In FIG. 4, a top view is shown of a substrate 1 on which, as in FIG. 1, Coriolis elements 100, 200 are arranged which are surrounded by drive elements 102, 202 that are interrupted on the respective facing sides. Coriolis elements 100, 200 and drive elements 102, 202 are again connected by springs 103, 203. Drive elements 102, 202 are connected to bearing blocks 106, 206 by springs 107, 207. Movable electrodes 104, 204, stationary electrodes 105, 205 and bearing blocks 106 for stationary electrodes 105, 205 are also provided. The two Coriolis elements 100, 200 are connected by a coupling spring 53. All these elements correspond to the elements as already described in FIG. 1 and perform the same function.

In contrast to FIG. 1, however, to verify the deflection of Coriolis elements 100, 200, in each case a frame-shaped verification element 140, 240 is provided in the interior of frame-shaped Coriolis elements 100, 200. Verification elements 140, 240 are likewise implemented as rectangular frame structures that are connected by spring elements 141, 241 to bearing blocks 106, 206 to substrate 1. Spring elements 141, 241 are yielding in the X-direction and stiff in the Y-direction, and thus essentially allow only for verification frames 140, 240 to be deflectable in the X-direction. Verification frames 140, 240 are connected to corresponding Coriolis elements 100, 200 by spring elements 142, 242. Spring elements 142, 242 are designed to be yielding in the Y-direction and stiff in the X-direction, and thus transmit the Coriolis forces in the X-direction particularly well. Arranged inside verification frames 140, 240 are again grid-shaped verification electrodes 143, 243, which are only alluded to in FIG. 4. A detailed view of these elements corresponds again to FIGS. 2 and 3.

The advantage of this arrangement can be seen in the fact that grid-shaped electrodes 143, 243 are essentially movable only in the X-direction, and thus no lateral movement takes place relative to the stationary electrodes. In FIG. 1 and in the detail view according to FIG. 2, movable electrodes 121 are directly connected to Coriolis element 100, so that these movable electrodes carry out a movement both in the X-direction and in the Y-direction. The movement in the X-direction is necessary for measuring the deflection of Coriolis element 100 in the X-direction. However, the movement in the Y-direction is not desired for the measurement, and can be a possible source of errors. In FIG. 4, however, verification frames 140, 240 and their anchorings via springs 141, 241 to substrate 1 are designed such that movable electrodes 143, 243 execute a movement only in the X-direction. Therefore, a possible cause for interferences in the measuring signal is eliminated.

Figure 5:
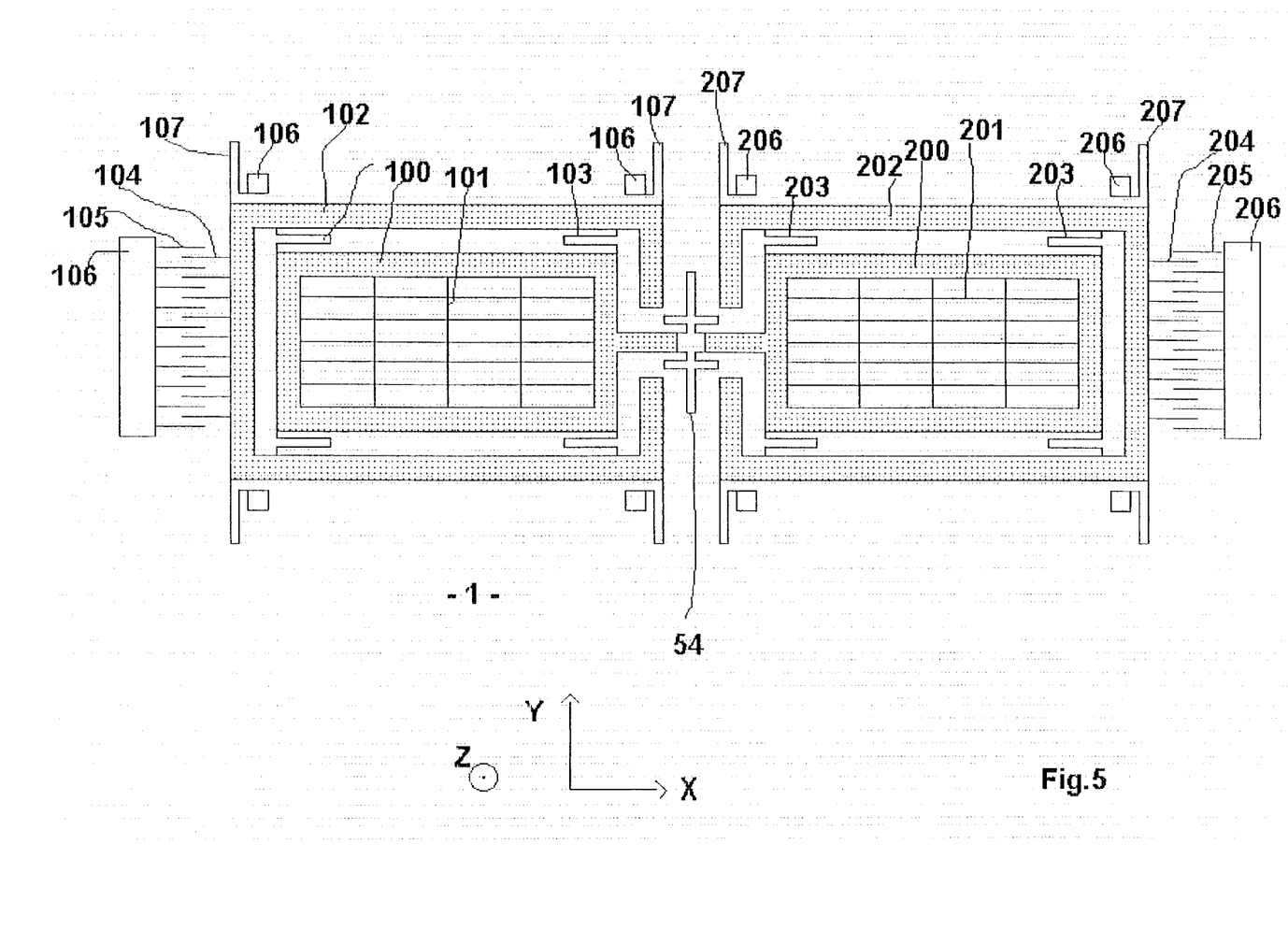
FIG. 5 shows a further exemplary embodiment of the yaw-rate sensor in a top view.

FIG. 5 shows a further exemplary embodiment. Elements 100, 200, 103, 203, 104, 204, 105, 205, 106, 206, 107, 207 correspond to the elements known from FIG. 1 and also serve the same functions. In contrast to FIG. 1, however, springs 103, 203 which connect Coriolis elements 100, 200 to drive elements 102, 202 are designed to be yielding in the Y-direction and stiff in the X-direction. Springs 107, 207 by which drive elements 102, 202 are connected to substrate 1 are designed to be yielding in the X-direction and stiff in the Y-direction. Moreover, electrodes 104, 105, 204, 205, with their lengthwise direction, are parallel to the X-direction. By applying electric voltages to electrodes 104, 105, 204, 205, forces may be generated in the X-direction which cause an oscillation of the drive elements in the X-direction. Springs 103, 203 transmit this oscillation to Coriolis elements 100, 200 which consequently move relative to the substrate. In response to a rotation of the substrate about the Z-axis, Coriolis forces are generated which result in an oscillation of Coriolis elements 100, 200 in the Y-direction. The oscillations of the Coriolis elements are coupled to each other both in the X-direction and the Y-direction by coupling spring 54 which is yielding both in the X-direction and in the Y-direction. The coupling again causes the frequency separation of the oscillation modes already described before. Verification elements 101 and 201, graphically only alluded to in FIG. 5, correspond to the description of FIGS. 2 and 3, the verification direction in each case being parallel to the Y-direction, however.

Figure 6:
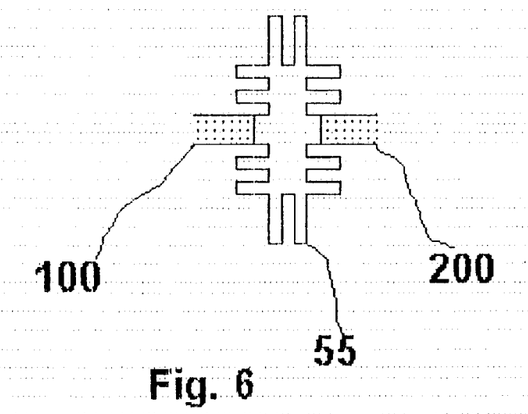
FIG. 6 shows another exemplary embodiment for the coupling spring according to the present invention.

FIG. 6 shows another exemplary embodiment for the coupling spring according to the invention. Only coupling spring 55 is shown which is positioned between Coriolis elements 100 and 200 that are only alluded to in FIG. 6. Coupling spring 55 is designed as a double folded spring both in the Y-direction and in the X-direction, i.e., it has in each case 2 loops in both directions. Such springs may be designed to be particularly yielding, with low space requirements. The number of loops may be further increased according to need.

Figure 7:
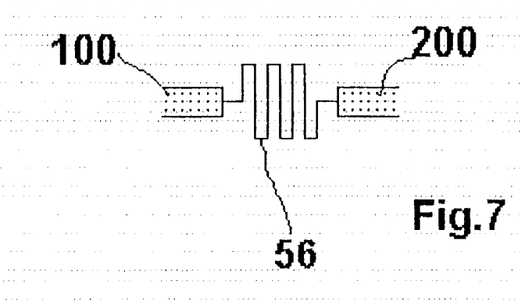
FIG. 7 shows another exemplary embodiment for the coupling spring according to the present invention.

Another exemplary embodiment for the coupling spring according to the invention is shown in FIG. 7. Only coupling spring 56 is shown which is positioned between Coriolis elements 100 and 200 that are only alluded to in FIG. 7. Coupling spring 56 is implemented as a multiply folded spring in the X-direction. Because of the high number of folds, this spring also exhibits a yielding spring constant in the Y-direction.

Figure 8:
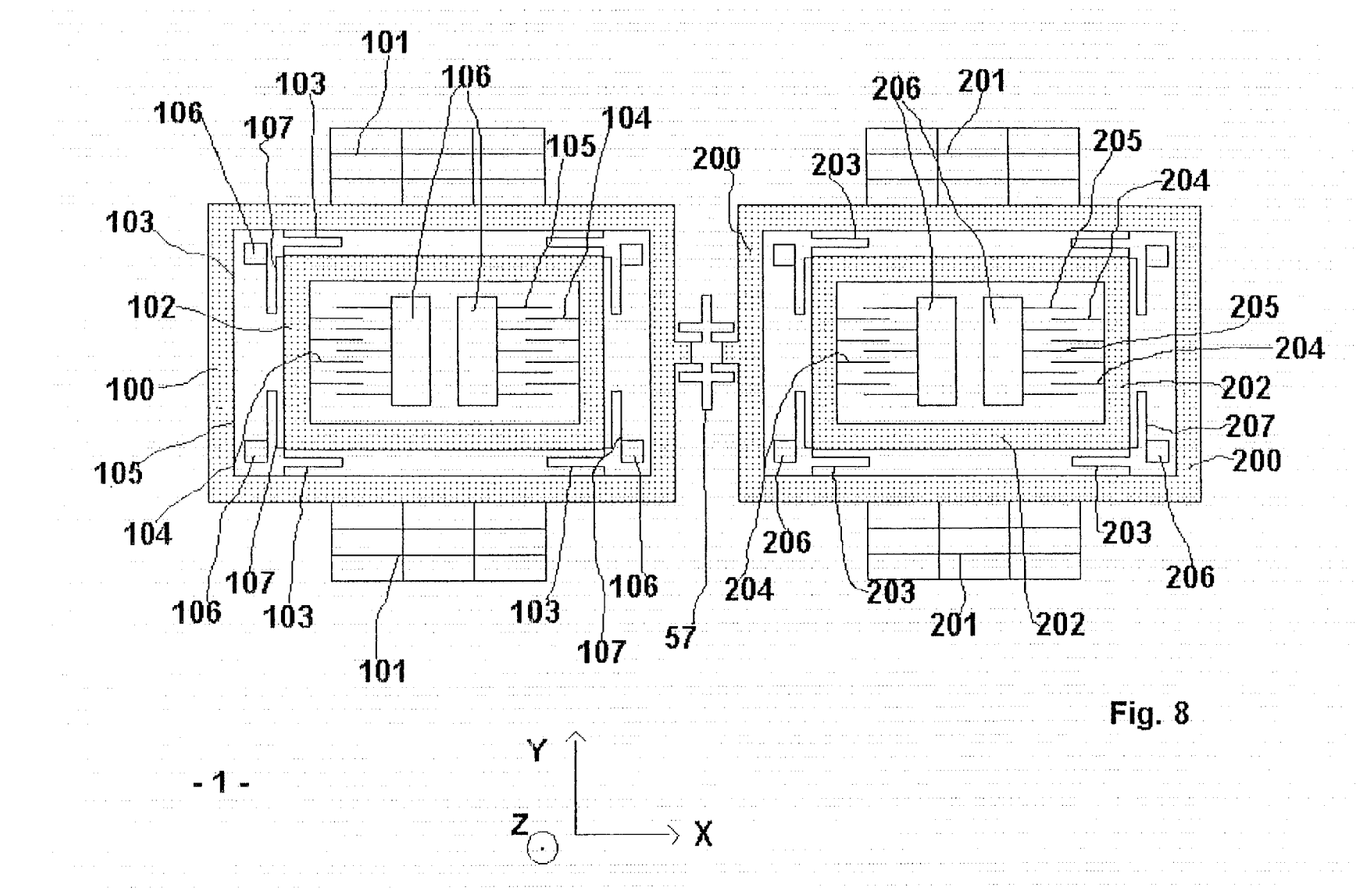
FIG. 8 shows a top view of another exemplary yaw-rate sensor according to the present invention.

FIG. 8 shows a further exemplary embodiment. Elements 100, 200, 103, 203, 104, 204, 105, 205, 106, 206, 107, 207 correspond to the elements known from FIG. 1 and also serve the same functions. In contrast to FIG. 1, however, drive elements 102, 202 are formed as an inner frame, and the Coriolis element is formed as an outer frame 100, 200. Arranged on drive elements 102, 202, on the inner side of the frame-type drive structure, are movable electrodes 104, 204 which grab into stationary electrodes 105, 205 that are secured to bearing blocks 106, 206. Electrodes 104, 105, 204, 205 are arranged in such a way that forces may be generated parallel to the X-direction. Drive elements 102, 202 are connected to Coriolis elements 100, 200 by springs 103, 203 that are stiff in the X-direction and yielding in the Y-direction. Drive elements 102, 202 are connected to bearing blocks 106, 206, and thus to substrate 1, by springs 107, 207 that are yielding in the X-direction and stiff in the Y-direction. Detection means 101, 201 are disposed on the outside of Coriolis elements 100, 200, and are provided in such a way that a deflection in the Y-direction is verified. They correspond to the elements as were already described with respect to FIG. 5. The two Coriolis elements 100 and 200 are again connected by a coupling spring 57 that is designed to be yielding in the Y-direction and the X-direction. The advantage of the outside arrangement of the Coriolis elements can be seen in that coupling spring 57 may be positioned particularly easily between the two Coriolis elements 100 and 200. No opening in the frame-type structure of drive elements 102, 202 is necessary, and mechanical stability of the yaw-rate sensor is improved. The functioning of the structure shown in FIG. 8 corresponds to FIG. 5.

What is claimed is:

1. A yaw-rate sensor, comprising:
   a substrate;
   a first coriolis element;
   a second coriolis element;
   an excitation arrangement to induce the first coriolis element and the second coriolis element to oscillate parallel to a first axis;
   a detection arrangement to verify a deflection of the first coriolis element and the second coriolis element based on a coriolis force in a second axis that is perpendicular to the first axis, the first axis and the second axis being parallel to the surface of the substrate; and
   a coupling spring to connect the first coriolis element and the second coriolis element to each other, and that is yielding in the first axis and in the second axis;
   wherein the first coriolis element and the second coriolis are arranged side-by-side and above a surface of the substrate.

2. The yaw-rate sensor of claim 1, wherein the first coriolis element includes a first gravitational center and the second coriolis element includes a second gravitational center, and in response to oscillation, the first gravitational center and the second gravitational, without the effect of the coriolis force, execute a movement on straight lines parallel to the surface of the substrate which are perpendicular to a straight line running through the first gravitational center and the second gravitational center.

3. The yaw-rate sensor of claim 1, wherein the first coriolis element includes a gravitational center and the second coriolis element includes a gravitational center, and in response to oscillation, the first gravitational center and the second gravitational center without the effect of the coriolis force, execute a movement on a straight line that runs through the first gravitational center and the second gravitational center.

4. The yaw-rate sensor of claim 1, wherein the first coriolis element includes a first drive element and the second coriolis element includes a second drive element, and the first drive element and the second drive element are connected to the first coriolis element and the second coriolis element by a plurality of springs that are stiff in the first axis and yielding in the second axis.

5. The yaw-rate sensor of claim 4, wherein the first drive element and the second drive element are connected to the substrate by a plurality of springs that are yielding in the first axis and stiff in the second axis, and the excitation arrangement is connected to the first drive element and the second drive element.

6. The yaw-rate sensor of claim 5, wherein the excitation arrangement includes a plurality of electrostatic comb drives.

7. The yaw-rate sensor of claim 1, wherein the detection arrangement includes a plurality of movable electrodes connected to the first coriolis element and the second coriolis element, and that are arranged opposite a plurality of stationary electrodes that are connected to the substrate.

8. The yaw-rate sensor of claim 1, wherein the detection arrangement includes a first verification element and a second verification element that are connected to the first coriolis element and the second coriolis element by a plurality of springs that are yielding in the first axis and stiff in the second axis.

9. The yaw-rate sensor of claim 8, wherein the first verification element and the second verification element include a plurality of movable electrodes that are arranged opposite to a plurality of stationary electrodes that are connected to the substrate.

10. The yaw-rate sensor of claim 8, wherein the first verification element and the second verification element are connected to the substrate by a plurality of springs that are stiff in the first axis and yielding in the second axis.

* * * * *

UNITED STATES PATENT AND TRADEMARK OFFICE
CERTIFICATE OF CORRECTION

PATENT NO.    : 6,752,017 B2
DATED         : June 22, 2004
INVENTOR(S)   : Rainer Willig et al.

It is certified that error appears in the above-identified patent and that said Letters Patent is hereby corrected as shown below:

Title page,
Item [57], ABSTRACT,
Line 1, change "is proposed having a first" to -- including a first --
Line 2, change "element (100,200) which are" to -- element that are --
Line 3, change "a surface (1) of a substrate." to -- a surface of a substrate --
Line 5, change "elements (100,200) are" to -- elements are --
Line 8, change "elements (100,200) are" to -- elements are --
Line 9, change "spring (52) which is designed" to -- spring that is configured --

Column 1,
Line 3, change "Background Information" to -- FIELD OF THE INVENTION --
Lines 4-6, change "is based on a yaw-rate sensor according to the definition of the species in the independent patent claim." to -- relates to a yaw-rate sensor. --
Line 8, insert -- Background Information --
Lines 9-10, change "already known from the U.S. Pat." to -- discussed in U.S. Pat. --
Line 13, change "which is like wise parallel" to -- which is parallel --
Line 16, change "In contrast, the yaw-rate sensor of the present invention" to
-- The yaw-rate sensor according to the present invention may provide that --
Lines 17-18, change "having the features of the independent patent claim has the advantage" to -- may provide that --
Lines 19-20, change "Thus, it is possible to specifically excite" to -- Thus, it is allowed for specific excitement of --
Lines 22-23, delete "further advantages and improvements are yielded by the measures in the dependent patent claims."
Line 27, change "elements because of" to -- elements due to --
Lines 36-37, change "as excitation means." to -- as an excitation arrangement. --
Line 38, change "element has movable" to -- element includes movable --
Lines 41-42, change "it is possible in particular to suspend" to -- it is allowed for suspension of --
Line 43, change "way on the substrate" to -- manner on the substrate --
Line 44, change "forces takes place." to -- forces occurs. --
Line 45, change "because of a movement" to -- due to a movement --
Lines 47-48, delete "Brief Description of the Drawings"
Line 49, change "the invention" to -- the present invention --
Line 50, change "the Drawing" to -- the drawings --
Between lines 51-52, insert -- BRIEF DESCRIPTION OF THE DRAWINGS --
Line 52, change "first yaw" to -- first exemplary yaw --
Line 54, change "the yaw" to -- the exemplary yaw --

UNITED STATES PATENT AND TRADEMARK OFFICE
CERTIFICATE OF CORRECTION

PATENT NO. : 6,752,017 B2
DATED : June 22, 2004
INVENTOR(S) : Rainer Willig et al.

It is certified that error appears in the above-identified patent and that said Letters Patent is hereby corrected as shown below:

Column 2,
Line 1, change "SPECIFICATION" to -- DETAILED DESCRIPTION --
Line 3, change "the invention" to -- the present invention --
Line 14, change "means" to -- arrangement --
Line 15, change "means are" to -- arrangement is --
Line 33, delete "likewise"
Line 39, change "way" to -- manner --
Line 42, change "designed" to -- configured --
Line 44, delete "essentially"

Column 3,
Line 1, change "take place" to -- occur --
Line 13, change "form" to -- form an --
Line 14, change "means" to -- arrangement --
Line 16, change "being" to -- are --
Line 27, change "must be" to -- are --
Line 31, change "must also be" to -- is also --
Line 33, change "must be" to -- are --
Line 36, change "must also be" to -- also --
Line 54, change "designed" to -- configured --
Line 58, change "usually occurring" to -- that may occur. --
Line 61, change "designed" to -- configured --
Line 62, change "way" to -- manner --
Line 67, change "designed" to -- configured --

Column 4,
Line 3, change "It is also advantageous, relative" to -- Relative --
Line 5, change "takes place" to -- may occur --
Line 5, change "The advantage of this principle is that" to -- This may allow for --
Line 6, change "Z axis is" to -- Z axis that is --
Line 12, change "means" to -- arrangement --
Line 15, change "means" to -- arrangement --
Line 16, change "being" to -- is --
Line 60, change "is preferably" to -- may be --
Line 61, delete "where it is necessary"

Column 5,
Line 3, change "possible to generate" to -- allowed to generation of --
Line 6, change "invention" to -- present invention --
Line 23, delete "likewise"

UNITED STATES PATENT AND TRADEMARK OFFICE
CERTIFICATE OF CORRECTION

PATENT NO.    : 6,752,017 B2
DATED         : June 22, 2004
INVENTOR(S)   : Rainer Willig et al.

It is certified that error appears in the above-identified patent and that said Letters Patent is hereby corrected as shown below:

Column 5 (cont'd),
Line 31, change "designed" to -- configured --
Line 38, delete "advantage of this arrangement can be seen in the fact that"
Line 39, delete "essentially"
Line 40, change "takes place" to -- occurs --
Line 44, change "carry out" to -- perform --
Line 49, change "can be a possible" to -- may be a --
Line 51, change "designed" to -- configure --
Line 53, change "possible" to -- potential --
Line 57, delete "known"
Line 60, change "designed" to -- configured --
Line 63, change "designed" to -- configured --

Column 6,
Line 15, change "being" to -- is --
Line 18, change "invention" to -- present invention --
Line 21, change "designed" to -- configured --
Line 22, change "has" to -- includes --
Line 24, change "designed" to -- configured --
Line 28, change "invention" to -- present invention --
Line 33, change "Because of" to -- Due to --
Line 38, change "known from" to -- from --
Line 46, change "way" to -- manner --
Line 53, change "means" to -- arrangements --

Signed and Sealed this

Twenty-fourth Day of May, 2005

JON W. DUDAS
*Director of the United States Patent and Trademark Office*